(12) United States Patent
Horvitz

(10) Patent No.: US 6,415,304 B1
(45) Date of Patent: Jul. 2, 2002

(54) WAITING PRIOR TO ENGAGING IN ACTION FOR ENHANCEMENT OF AUTOMATED SERVICE

(75) Inventor: Eric Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/313,090

(22) Filed: May 17, 1999

Related U.S. Application Data

(63) Continuation-in-part of application No. 09/295,077, filed on Apr. 23, 1999.

(51) Int. Cl.$^7$ ............... G06F 15/00; G06F 17/00; G06F 17/21; G06F 17/24
(52) U.S. Cl. ............... 707/500.1; 345/752
(58) Field of Search ............... 705/7–10; 709/700–863, 709/961–978, 204; 707/1–10, 500.1

(56) References Cited

U.S. PATENT DOCUMENTS

| | | | |
|---|---|---|---|
| 5,864,848 A | | 1/1999 | Horvitz et al. ............... 707/6 |
| 5,867,822 A | * | 2/1999 | Sankar ............... 705/8 |
| 5,948,058 A | * | 9/1999 | Kudoh et al. ............... 709/206 |
| 6,182,118 B1 | * | 1/2000 | Finney et al. ............... 709/206 |
| 6,047,260 A | * | 4/2000 | Levinson ............... 705/9 |
| 6,101,480 A | * | 8/2000 | Conmy et al. ............... 705/9 |
| 6,016,478 A | * | 12/2000 | Zhang et al. ............... 705/9 |
| 6,167,567 A | * | 12/2000 | Chiles et al. ............... 717/11 |
| 6,199,102 B1 | * | 3/2001 | Cobb ............... 709/206 |
| 6,278,996 B1 | * | 8/2001 | Richardson et al. ............... 707/6 |

OTHER PUBLICATIONS

Microsoft Press Computer Dictionary, Microsoft Press, Third Edition, p. 403.*
U.S. application No. 09/192,001, filed Nov. 13, 1998.
U.S. application No. 09/455,477, filed Apr. 6, 1998.
U.S. application No. 08/684,003, filed Apr. 6, 1988.
Eric Horvitz, Matthew Bary, Display of Information for Time–Critical Decision–Making, Proceedings of the Eleventh Conference on Uncertainty in Artifical Intelligence, Montreal, Aug. 1995.
Eric Horvitz, Jack Breese, David Heckerman, David Hovel, Koos Rommelse, The Lumiere Project: Bayesian User Modeling for Inferring the Goals and Needs of Software Users, Proceedings of the Fourteenth Conference on Uncertainty in Artifical Intelligence, Madison, WI, Jul. 1998. Morgan Kaufmann Publishers, pp. 256–265.
Susan Dumais, John Platt, David Heckerman, Mehran Sahami, Inductive Learning Algorithms and Representations for Text Categorization, Proceedings of ACM–CIKM98, Nov. 1998.
Ben Shneiderman, Pattie Maes, Direct Manipulation vs Interface Agents: Excerpts form debates at IUI 97 and CHI 97, interactions, Nov.–Dec. 1997, pp. 42–61.
M. Sahami, S. Dumais, D. Heckerman, E. Horvitz, A Bayesian Approach to Filtering Junk E–mail, AAAI Workshop on Text Classification, Jul. 1998, Madison, Wisconsin, AAAI Technical Report WW–98–05.

* cited by examiner

*Primary Examiner*—John Breene
*Assistant Examiner*—Susan Rayyan
(74) *Attorney, Agent, or Firm*—Amin & Turocy, LLP

(57) ABSTRACT

Waiting prior to engaging an automated service, for enhancement thereof, is disclosed. In one embodiment, a computer-implemented method first determines an automated service to be performed. The method waits a predetermined time between a minimum time and a maximum time, before performing the automated service. In one embodiment, the method determines the predetermined time by performing a statistical regression as to the predetermined time that should be waited based on a length of a received text.

17 Claims, 8 Drawing Sheets

WAITING PRIOR TO ENGAGING IN ACTION FOR ENHANCEMENT OF AUTOMATED SERVICE

RELATED APPLICATIONS

This application is a continuation-in-part of copending and coassigned application entitled "Learning by Observing a User's Activity for Enhancing the Provision of Automated Services", U.S. patent application Ser. No. 09/295,077, filed on Apr. 23, 1999, and is related to the coassigned and copending applications entitled "A Decision-Theoretic Approach to Harnessing Text Classification for Guiding Automated Action", U.S. patent application Ser. No. 09/295,088, filed on Apr. 23, 1999, and "Systems and Methods for Directing Automated Services for Messaging and Scheduling", U.S. patent application Ser. No. 09/295,146, filed Apr. 23, 1999, both of which are hereby incorporated by reference.

FIELD OF THE INVENTION

This invention relates generally to automated services, and more particularly to waiting prior to performing such services for enhancement thereof.

BACKGROUND OF THE INVENTION

Computer applications such as messaging and scheduling applications have become important applications in many computer users' lives. Messaging programs generally allow a user to send and receive electronic mail (e.g., messages) to and from other computer users, for example, over a local- or a wide-area network, or over an intranet, extranet, or the Internet. Scheduling programs generally allow a user to track appointments in a calendar. More sophisticated scheduling programs allow one user to schedule a group meeting with other computer users—checking the latter users' schedule availability, and receiving confirmation from the users upon them accepting or rejecting the group meeting appointment.

Within the prior art, however, messaging and scheduling programs are generally not very well integrated, even if they are components within the same computer program. For example, a user may receive a message from a colleague stating "Looking forward to seeing you at 2 p.m. on Thursday." Generally, however, the prior art does not provide for automatically directing the scheduling program to make a meeting appointment at 2 p.m. on Thursday. Instead, typically the user who has received the message has to open the scheduling program, access Thursday's calendar, and manually enter an appointment at 2 p.m. on Thursday's calendar. Because of the many steps required to go from reading the message within the messaging program to entering the information into the scheduling program, many users choose not to even use scheduling programs, or to only use them sparingly.

For these and other reasons, there is a need for the present invention.

SUMMARY OF THE INVENTION

The invention relates to waiting prior to engaging an automated service, for enhancement thereof. In one embodiment, a computer-implemented method first determines an automated service to be performed. The method waits a predetermined time between a minimum time and a maximum time, before performing the automated service. In one embodiment, the method determines the predetermined time by performing a statistical regression as to the predetermined time that should be waited based on a length of a received text.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
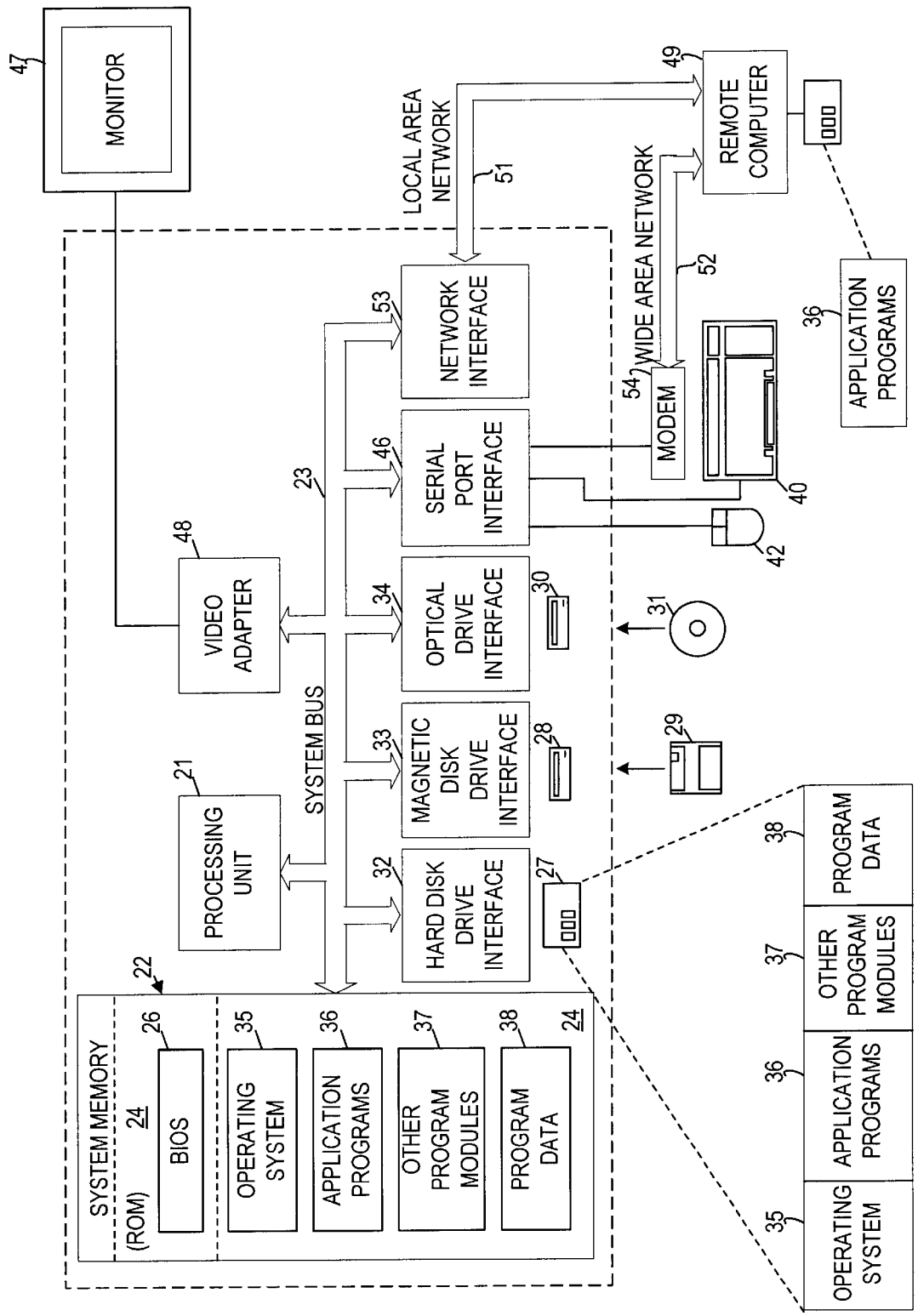
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

ILLUSTRATIVE EXAMPLE

Figure 2:
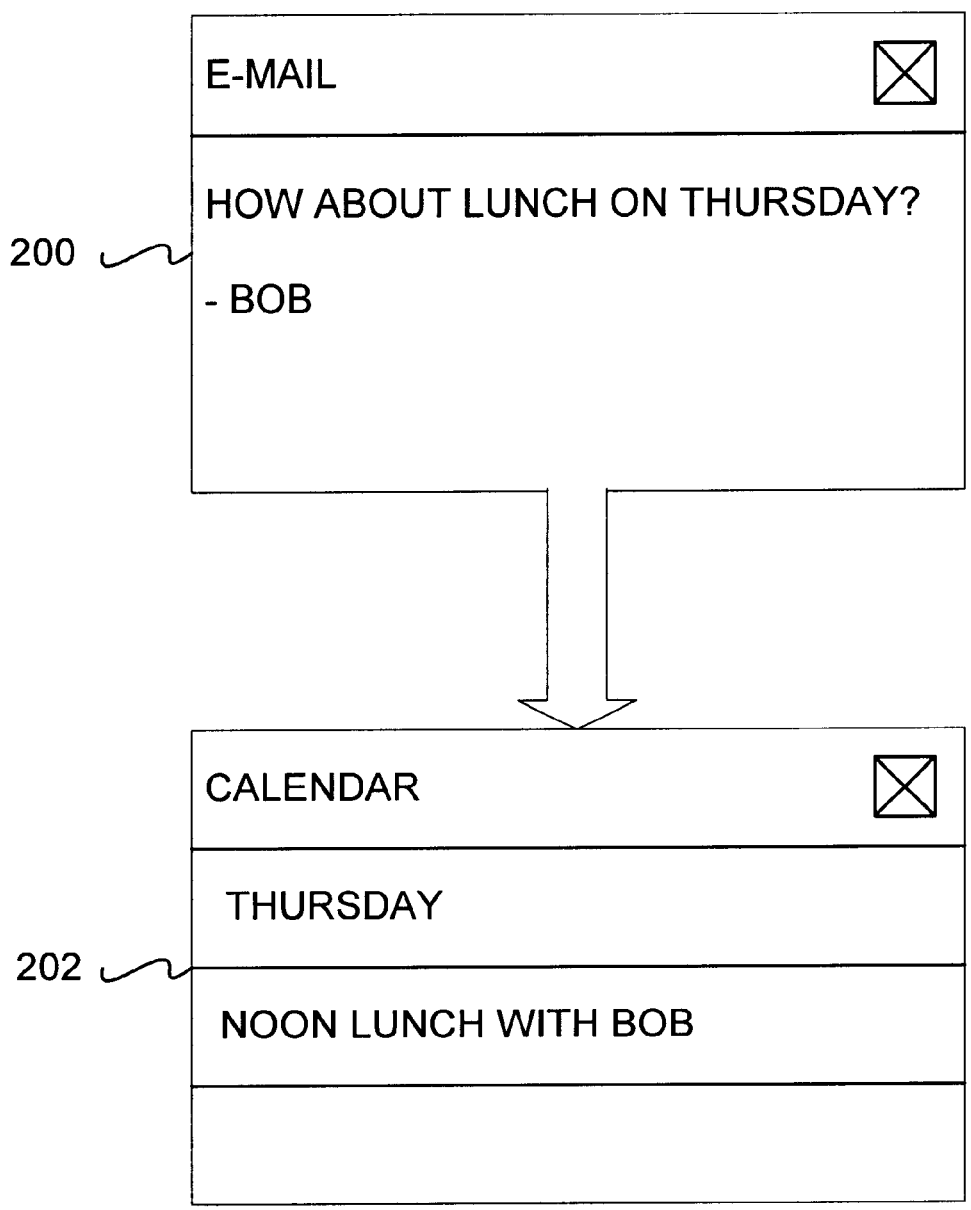
FIG. 2 is a diagram of an example of directed scheduling, according to an embodiment of the invention.

Prior to describing methods and systems of embodiments of the invention, an illustrative example according to an embodiment of the invention is first described in this section of the detailed description, with reference to FIG. 2. As stated in the summary, embodiments of the invention are not limited to any particular application. For example, in different embodiments of the invention, such applications include scheduling appointments, scoping calendars to appropriate ranges, forwarding messages, and sending various alerts to user. The example described in this section specifically relates to directing automated services for messaging and scheduling. Thus, in the example of FIG. 2, an electronic mail is shown in a window 200. The window 200 may be part of an electronic mail program, such as those available within the art. The electronic mail has the text, from a user named Bob, reading "How about lunch on Thursday?". In one embodiment of the invention, a window 202 of the scheduling program appears, such as scheduling programs available within the art. The embodiment of the invention causes a scheduling entry to be entered in the user's calendar for Thursday, at noon, reading "Lunch with Bob." Attempts are made to place the meeting as close to noon as possible but also checking in reasonable hours for lunch before and after noon if something already on the schedule encroaches on the 12:00 pm–1 pm schedule slot.

In other words, the embodiment of the invention of FIG. 2 determines the action probability of the text of the electronic mail in the in the window 200, and makes a decision for automatic scheduling based on the probability of the message. It then performs a scheduling action—parsing the text of the electronic message, and entering the entry in the scheduling program as is shown in the window 202. Thus, the embodiment of the invention is able to recognize that "Lunch" means about noon in time, and that "lunch on Thursday" sent from a single user to a single recipient is associated with a relatively high probability that the user will have the goal of wishing to review an online calendar or schedule an appointment (that is, a high probability that the electronic mail will stimulate a goal of calendar review or scheduling).

Those of ordinary skill within the art can appreciate that the example of FIG. 2 is meant only to illustrate how embodiments of the invention can operate, for purposes of understanding operation of embodiments of the invention, and does not represent limitations of the invention itself.

Methods

In this section of the detailed description, computer-implemented methods according to varying embodiments of the invention are described. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Figure 3:
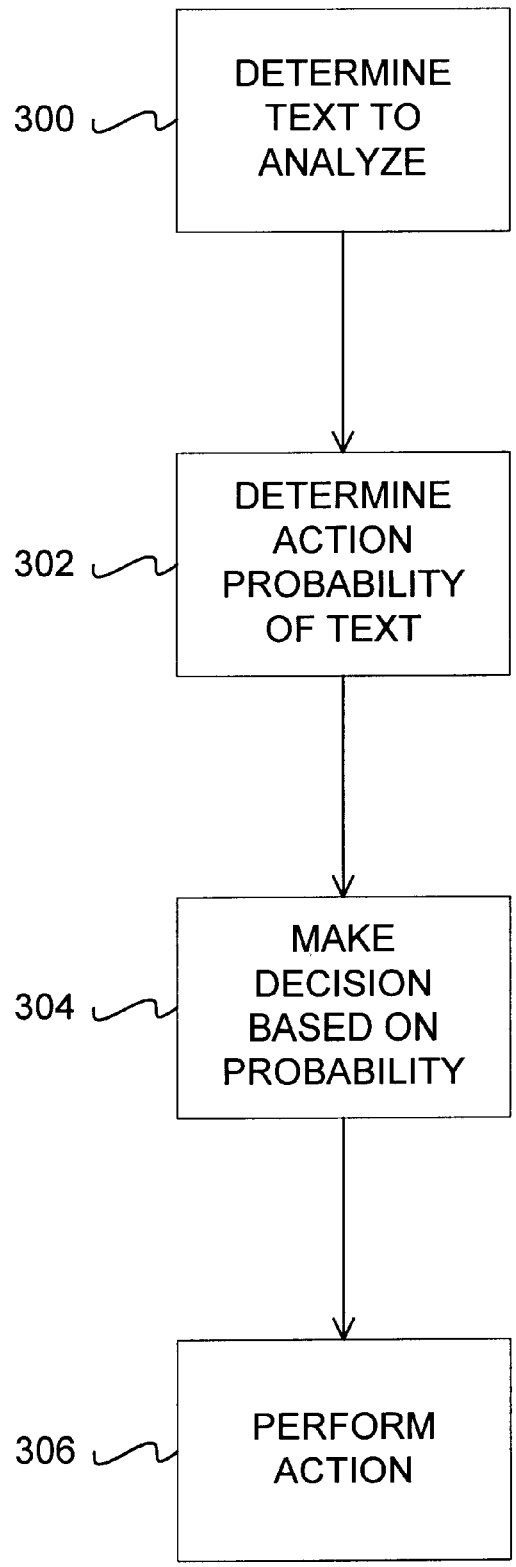
FIG. 3 is a flowchart of a method according to an embodiment of the invention.

A general method of an embodiment of the invention is first described in conjunction with FIG. 3, which is a flowchart of a method according to an embodiment of the invention. In 300, the method specifically determines a text to analyze. For example, the text can be a message of an electronic mail program that currently has focus. A message having focus is the message of the window that is currently open within a graphical user interface operating system. For example, ten windows may be open on the screen, such that each window has an electronic mail message therein. The window that is currently selected by the user is the window that is currently active, and thus the window that has focus. It is this window that the method selects in 300 in one embodiment of the invention, although the invention is not so limited. As another example, the text to be analyzed can be user input—for example, by the user copying or cutting text to a clipboard, as known within the art, and then invoking 300 of the method based on this text. The invention is not so limited.

In 302, the method next determines an action probability based on the text. The action probability of the text generally refers to the probability that the text relates to an action task. For example, in the context of scheduling programs, in general, a message reading "Good luck, Bob, on your new venture" has a low action probability, since it does not have subject matter relating to a scheduling task. Conversely, for example, in the context of scheduling programs, in general, a message reading "The next departmental meeting will be held at 5 on October 23" has a high action probability, since it does have subject matter relating to a scheduling task.

In other words, the action probability of a text is the probability that the user's goal for the text is to perform an action based on the message. In one embodiment of the invention, the action probability is determined in 302 by passing the text as input to a model such as a text classification system. Text classification systems are based on technologies for classifying objects based on attributes, including Support Vector Machines, decision trees, and combinations. In particular, in one embodiment of the invention, the model utilized is as described in U.S. Pat. No. 5,864,848, issued Jan. 26, 1999, which is hereby incorporated by reference. In another embodiment of the invention, the model utilized is as described in the previously filed and coassigned case entitled "METHODS AND APPARATUS FOR BUILDING A SUPPORT VECTOR MACHINE CLASSIFIER," Ser. No. 09/055,477, filed on Apr. 6, 1998, which is also hereby incorporated by reference. In addition, further information regarding the training of these models for the particular application in this case is later described in this application.

Once the action probability of the text has been determined in 302, then in 304, the method makes a decision based on the probability. More specifically, the method selects one of three options. First, the method can select inaction—that is, not to perform any action based on the message. Second, the method can select action, but with user approval—that is, to perform an action based on the text, but only after receiving confirmation from the user that the method should go ahead and perform the action. Third, the method can select automatic action—that is, to perform an action based on the text, automatically, without first receiving confirmation from the user.

In one embodiment of the invention, the method determines which of the three options to select based on probability thresholds associated with the boundaries among the three options. A first probability threshold is associated with the inaction| action with user approval boundary, and a second probability threshold is associated with the action with user approval|automatic action boundary. If the action probability is less than the first probability threshold, then the method selects inaction. If the action probability is greater than the first probability threshold but less than the second probability threshold, then the method selects action with user approval. Finally, if the action probability is greater than the second probability threshold, then the method selects automatic action.

An example is illustrative in understanding the probability thresholds. For example, the first probability threshold can be 0.4, while the second probability threshold can be 0.7. If a text has an action probability of 0.6, then the method selects action with user approval. In general, the inaction option relates to texts not having subject matter with high action probabilities; the action with user approval option relates to texts having subject matter with medium action probabilities; and, the automatic action option relates to texts having subject matter with high action probabilities.

The invention is not limited as to the manner by which the probability thresholds are determined. In one embodiment, they are user set. For example, with respect to the second probability threshold, the user may be suspicious of automatic action, and thus not want automatic action to occur unless the text being analyzed has a very high action probability, say over 90%. Conversely, for example, a user becoming more accustomed and trusting of automatic action may not want to be bothered with confirming suggested actions, and thus may set the second probability threshold to 70%, which means that texts having probability thresholds over 70% are automatically scheduled.

In other embodiments of the invention, the probability thresholds of the boundaries among the options that can be selected by the method are set in accordance with decision theory, such as utilizing cost/benefit analysis, both of which are known within the art, to provide for contextual and changing probability thresholds. This is described in the coassigned and copending case Ser. No. 09/295,088 entitled "A Decision-Theoretic Approach to Harnessing Text Classification for Guiding Automated Action", which has already been incorporated by reference.

Finally, in 306, the method performs an action based on the decision made in 304. That is, if automatic action was selected in 304, or if action with user approval was selected in 304 and actual user approval was received, then in 306 the action is performed. Conversely, if inaction was selected in 304, or if action with user approval was selected in 304 and actual user approval was not received, then in 306 no action is performed. The invention is not limited to a particular action or set of actions. Examples of actions that are amenable to the invention include scheduling appointments, scoping of calendars to appropriate ranges, forwarding messages, and sending various alerts to users; other examples include extracting a sender's address and contact information, forwarding, paging, routing and moving of or based on texts such as electronic mail messages, as those of ordinary skill within the art can appreciate. In one specific embodiment relating to scheduling appointments, the scheduling action can be performed in a manner balancing precision and confidence of the action, as is particularly described in the copending and coassigned application Ser. No. 09/295,146 entitled "Systems and Methods for Directing Automated Services for Messaging and Scheduling", which has already been incorporated by reference.

Figure 4:
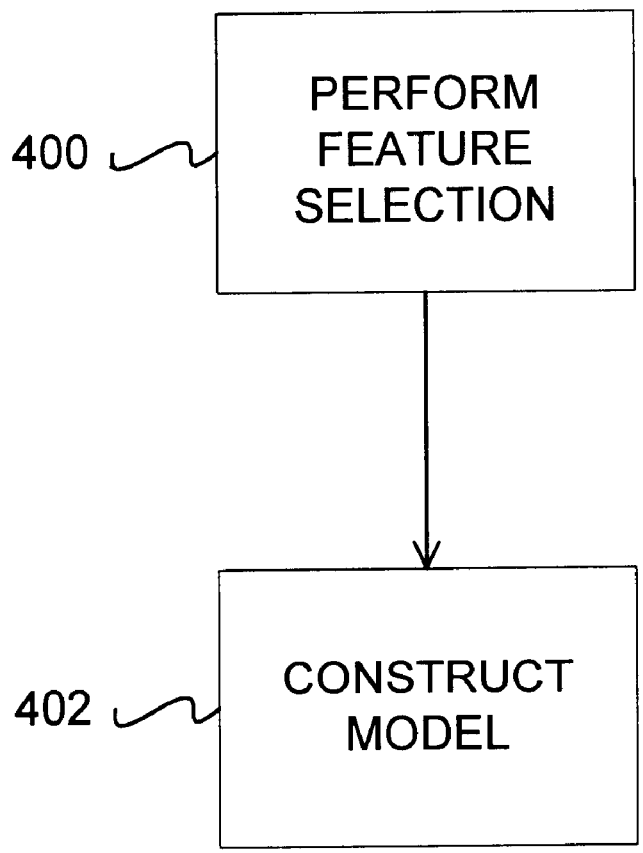
FIG. 4 is a flowchart of a method to construct a model utilized to determine an action probability of a text, according to an embodiment of the invention.

Referring next to FIG. 4, a flowchart of a method to train a text classification system or support vector machine according to an embodiment of the invention, for use in determining an action probability of a message, is shown. For example, the flowchart of FIG. 4 can be used to train a model that is used by 302 of FIG. 3 to determine an action probability of a message. That is, the flowchart of FIG. 4 can be used to initially generate the model used by 302 of FIG. 3. As has been stated, text classification systems and support vector machines are known within the art. Therefore, description of the method of FIG. 4 is specifically geared towards description of adaptation of such models for the applications used herein, as those of ordinary skill within the art can understand.

In 400, a feature selection phase is performed. Feature selection generally is known within the art. The feature selection phase is used to maximally discriminate between text that should be acted upon, and text that should not be acted upon. In one embodiment, this is accomplished by training the model. That is, a number of texts based on which action is to occur (e.g., 500 texts) are input into the feature selection phase, such that the phase knows a priori that the texts are such that action is to occur, and a number of texts based on which action is not to occur (e.g., 500 texts) are input into the feature selection phase, such that the phase knows a priori that the texts are such that action is not to occur. Thus, the model can then determine a maximum discrimination between those texts that are action related, and those texts that are not action related.

In addition, in one embodiment of the invention, feature selection occurs based on an initial seeding with domain-specific knowledge. The domain-specific knowledge can include words and phrases that typically are associated with action-related texts. For example, in the context of scheduling, such words and phrases may include ". . . get lunch," "let's meet," "meet about," etc. A list of such words and phrases that are used in one specific embodiment of the invention in the context of scheduling is provided in the coassigned and copending application Ser. No. 09/295,146 entitled "Systems and Methods for Directing Automated Services for Messaging and Scheduling", which has already been incorporated by reference. Those of ordinary skill within the art understand how such domain-specific knowledge can be used to seed feature selection to provide for maximum discrimination between action-related and non-action-related texts.

Next, in 402, once feature selection has been accomplished in 400, a model-construction phase is performed based on the feature selection. That is a model, such as a text classification system, or a support vector machine, as known within the art, is constructed, based on the feature selection accomplished in 400. The construction of such systems and machines, and such models generally, is known within the art.

Figure 5:
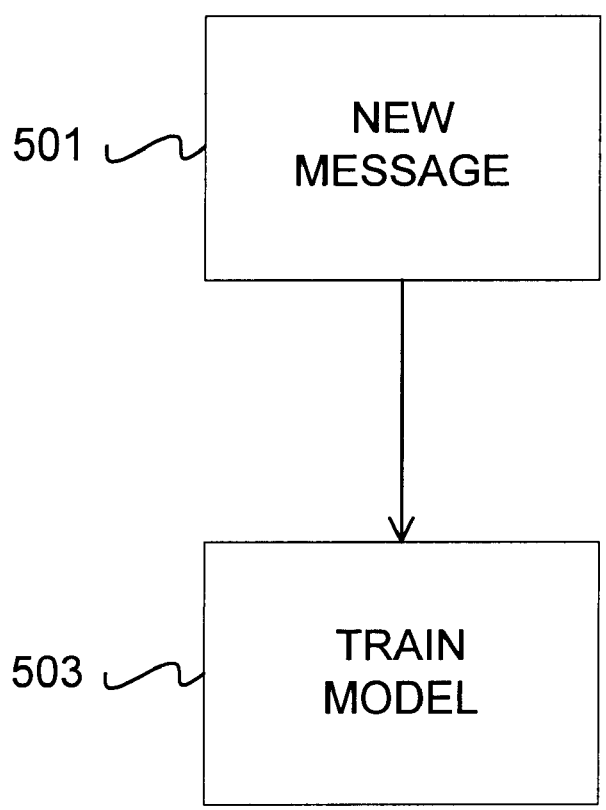
FIG. 5 is a flowchart of a method to train a text classification system according to an embodiment of the invention.

Referring next to FIG. 5, a flowchart of a method for the ongoing training the model, such as the text classification system already described, according to one embodiment of the invention, is shown. The continual training of the method of FIG. 5 can be in one embodiment in addition to the pretraining accomplished in accordance with the method of FIG. 4 that has already been described. The invention is not so limited, however.

In 501, a new message, that is, a new text is received. For example, this corresponds to 300 of FIG. 3 in one embodiment. In 503, the model used to determine action probabilities is trained based on the new text (e.g., the model of 402), in a manner consistent with the original training of the model as previously described, as those of ordinary skill within the art can appreciate. Thus, the prior model is such that a user is continually watched while working with an application, and the model is continually refined by training in the background and being updated in real time for decision making. For each message inputted into the model, a new case for the model is created. The cases are stored as negative and positive examples of texts associated with particular actions or services, such as calendaring or scheduling tasks, for use in training the model, as those of ordinary skill within the art can understand.

In addition, in one embodiment, the action as well as the entire message (text) is stored. If calendaring occurs within a time frame of opening the message, in one mode, or if scheduling occurs whenever a message has focus, in another mode of learning, the message is tagged as a positive instance of being action relevant. In another mode, negative cases are assigned for messages that are not associated with scheduling actions over their history of review. Thus, an automated text classification system based on support vector machines, in one embodiment, is trained in the background based on user preference. In one embodiment, a new model is built in the background based on the earlier and new data set. Based on user preference, the new model can be built in the background, upon exit, per a schedule, per number of new cases, etc. The invention is not so limited.

Learning can occur when the automated services are turned off, or when the service is in use making a stream of ongoing guesses. When the automated system is in use, immediate cancellation of suggestions or actions to display a calendar or schedule an appointment are taken as negative cases. A user's manual actions to review a calendar or to schedule an appointment when the system has not appropriately taken such action are taken as positive examples.

In one embodiment, the set of new cases continues to be appended to previously collected cases. In another embodiment, cases are dropped out as they reach a certain age, when there is sufficient data, keeping the models based on a significant amount of more recent training data.

Data can be stored as the set of cases itself or as an incrementally extended, more compressed index containing the statistics of terms derived from training sets.

Figure 6:
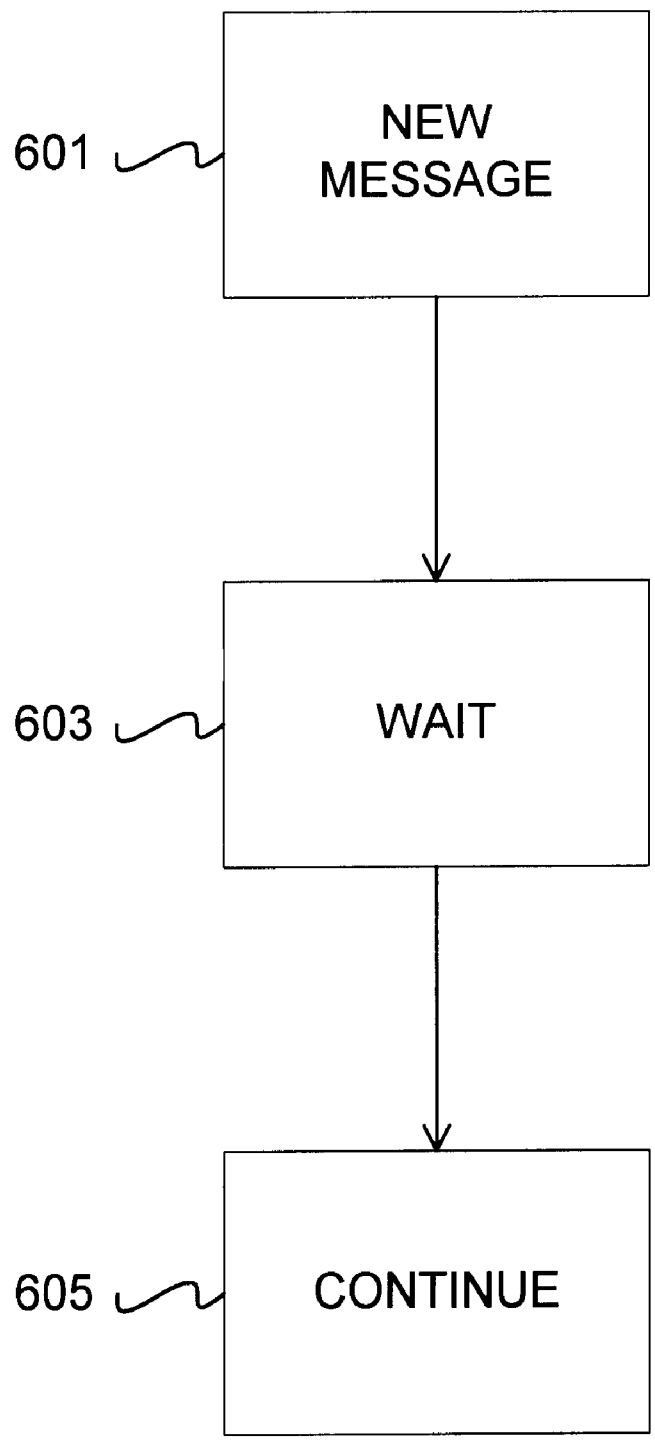
FIG. 6 is a flowchart of a method to wait a predetermined time prior to selecting an option or providing an action, according to an embodiment of the invention.

Referring next to FIG. 6, a method for learning and harnessing the timing of human-computer interactions to guide automated services, according to an embodiment of the invention, is shown. This method is built on the insight that automated service at the wrong time can be costly, and that the value of automated services can be enhanced by learning about the appropriate timing of the service. Thus, in 601, a new message or text is input, corresponding to 300 of the method of FIG. 3. A predetermined time is then waited in 603, and then the method continues in 605. The continuing in 605 can correspond to 302, 304 or 306 of the method of FIG. 3; that is, the waiting of 603 in the context of the method of FIG. 3 occurs after 300 is performed, and before either 302, 304 and 306, in different embodiments of the invention.

Figure 7:
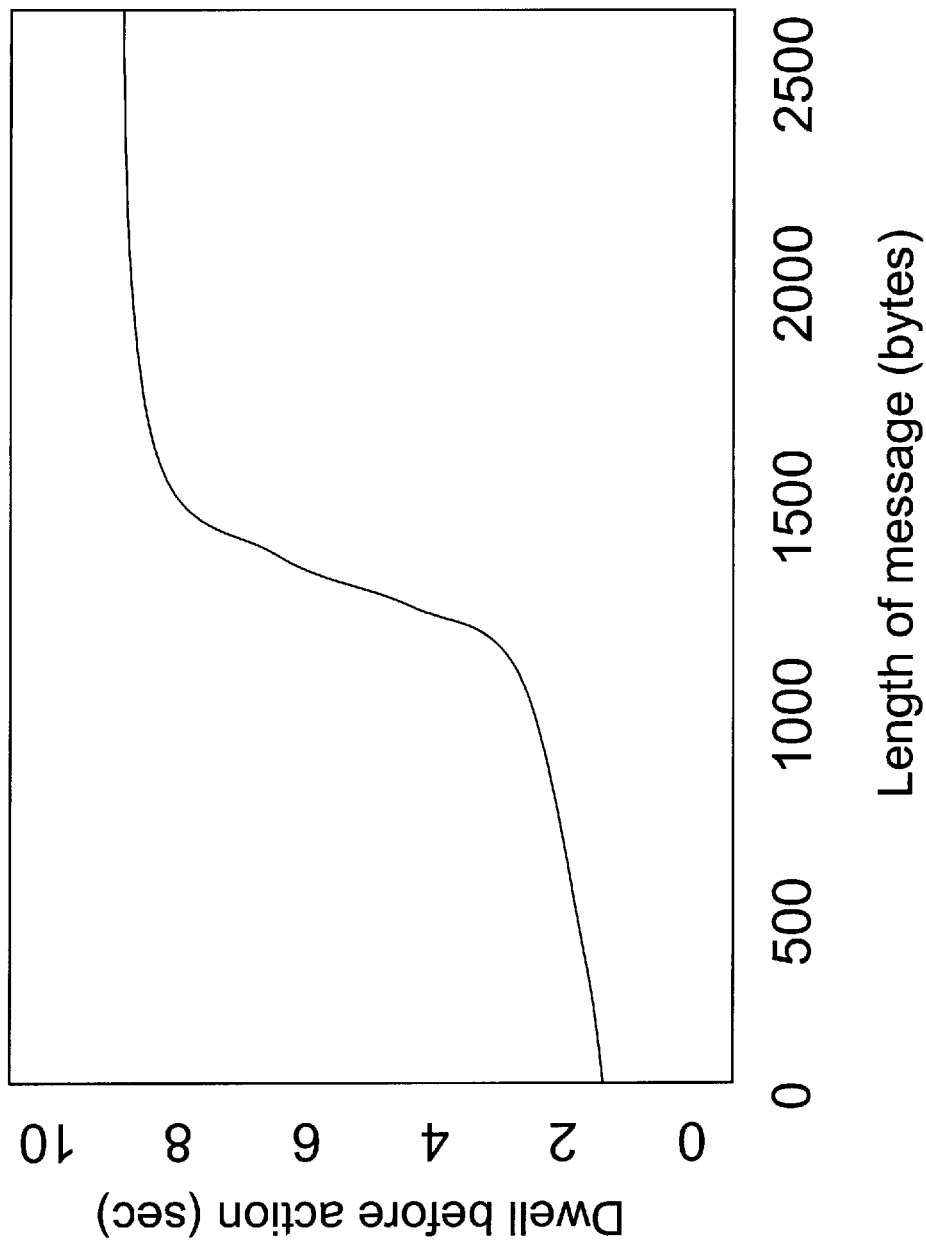
FIG. 7 is a diagram of a statistical regression graph that can be used to determine the predetermined time to wait in accordance with embodiments of the invention; and, FIG. 8 is a diagram of a system according to an embodiment of the invention.

In one embodiment, the predetermined time is determined by performing a statistical regression as to the predetermined time that should be waited, based on the length of each text (message) received. That is, the amount of time that has elapsed between the opening of a message and the invocation of a service or action such as a calendaring operation is stored, as well as any properties of the message. For example, the length of the new portion of each message, as opposed to the long thread of earlier messages to which the message is in reply or extension, can be stored in bytes. Also, the number of dates and times or the location of the first mention of dates and times in the message can be stored. When learning is performed, a statistical regression analysis is employed to determine the most appropriate amount of delay for allowing the user to attend to the message and process the content of the message before distracting the user with services, or a dialog about the services, as a function of message length. An example of a statistical regression for a plurality of messages and their associated predetermined delay times is shown in FIG. 7. Furthermore, in one embodiment, minimum and maximum times for delay are also employed. These can be defined by the user in one embodiment. Linear regression and nonlinear regression methods can be useful. One embodiment uses a non-linear regression model by fitting the data to an S-shaped curve.

In other embodiments of the invention, the time to wait is determined based on a model of one or more of a user's goals, needs, or attention. This model itself can be based on one or more of real-time observations, a saved profile about the user's timing preferences that can be built up over time, or a direct specification from the user. The invention is not so limited, however.

System

Figure 8:
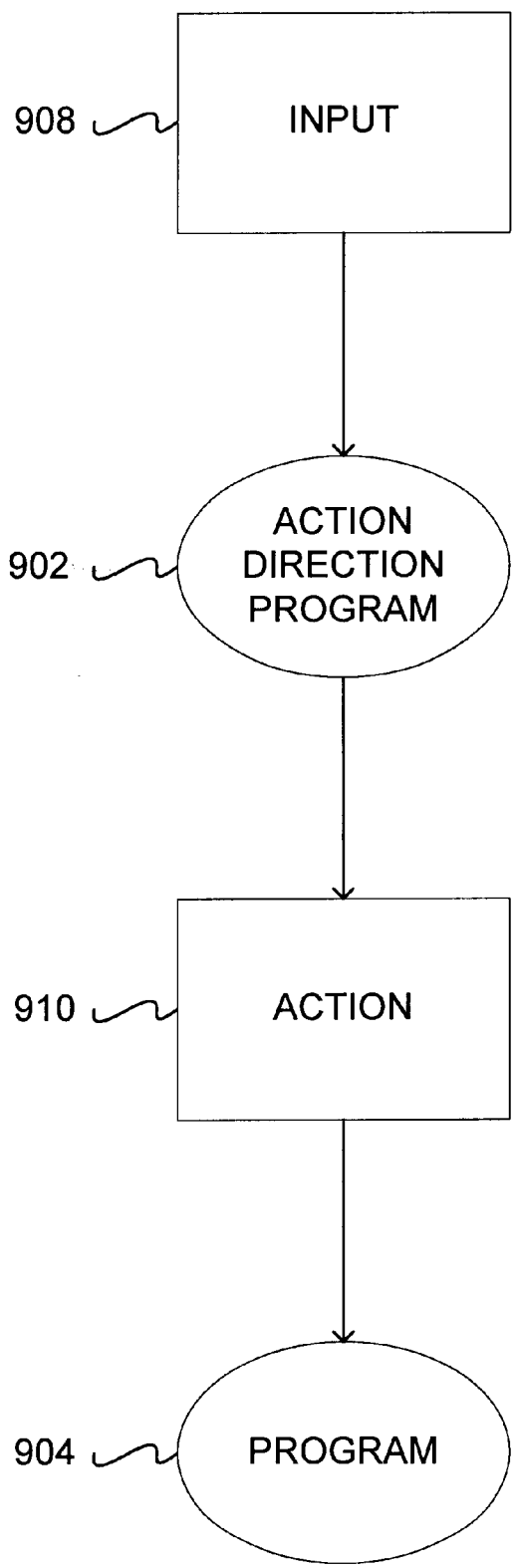

In this section of the detailed description, a system according to an embodiment of the invention is described, in conjunction with FIG. 8. The system of FIG. 8 includes an action direction program 902, and a program 904. In one embodiment, one or more of the programs 902 and 904 is a computer program executed by a processor of a computer (such as the computer described in conjunction with FIG. 1) from a computer-readable medium, such as a memory, of the computer. The action direction program 902 has an input 908, for example, from an electronic mail program (not shown in FIG. 8), or another programs (also not shown in FIG. 8). The action direction program 902 provides an action 910 as an output, which is utilized by the program 904.

The input 908 to the action direction program 902 is in one embodiment text, such as the message of an electronic mail as can be provided by an electronic mail program, although the invention is not so limited. Furthermore, the program 904 is a program that is able to perform the action 910. For example, in one embodiment the program 904 is a scheduling program in which a user is able to track appointments within a calendar, such that the action 910 includes a scheduling action that the scheduling program can act upon (e.g., a specific appointment, etc.). In this example, then, the action direction program 902 is a program in which appointments can be gleaned from the input 908 to be made in conjunction with the scheduling program.

The action direction program 902 first determines an action probability based on the input 908. Based thereon, it selects one of the following three options: (1) inaction, (2) automatic action, and (3) suggested action with user approval. If either option (2) is selected, or option (3) is selected and the user has approved the suggested action, then the action direction program 902 performs an action 910 within the program 904. In one embodiment, this determination of an action probability and the option selection based thereon is made by the program 902 in accordance with the methods previously described, although the invention itself is not necessarily so limited.

In addition, in one embodiment of the invention, the program 902 first initially waits a predetermined time prior to either determining an option, or performing an action or suggestion an action to the user. This can be determined by statistical regression, as has been previously described. Furthermore, in one embodiment of the invention, the program 902 continually trains a text classification system to determine the action probability of the input 908, based on each text (that is, each input) input as the input 908. This is in accordance with continual training as has been already described.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

Therefore, it is manifestly intended that this invention be limited only by the following claims and equivalents thereof.

I claim:

1. A computer-implemented method comprising:
   determining an automated service to be performed;
   determining a time to be waited prior to performing the automated service by performing a statistical regression as to the time based on a length of a received text;
   waiting the time; and,
   performing the automated service.

2. A machine-readable medium having processor instructions stored thereon for execution by a processor to cause performance of a method comprising:
   determining an automated service to be performed in connection with a message;
   determining a length of the message;
   waiting a predetermined time between a minimum time and a maximum time, the predetermined time corresponding to the length of the message; and
   performing the automated service.

3. The medium of claim 2, determining the predetermined time by performing a statistical regression as to the predetermined time that should be waited based on the length of the message.

4. The medium of claim 2, further comprising determining the predetermined time based on a model of at least one of a user's goals, a user's needs, or attention.

5. The medium of claim 2, further comprising determining the predetermined time based on at least one of: real-time observations, a profile about user time preferences, and a direct specification of the user.

6. The medium of claim 2, wherein at least one of the minimum time and the maximum time is defined by a user.

7. A machine-readable medium having processor instructions stored thereon for execution by a processor to cause performance of a method comprising:
   determining an automated service to be performed;
   determining a time to be waited prior to performing the automated service by performing a statistical regression as to the time based on a length of a received text;
   waiting the time; and,
   performing the automated service.

8. A computerized system comprising:
   a program in which a user is able to perform an action; and,
   an action direction program to determine an automated service to be performed in conjunction with the program after waiting a predetermined time between a minimum time and a maximum time.

9. The system of claim 8, wherein the action direction program determines the predetermined time by, for a text received, performing a statistical regression as to the predetermined time that should be waited based on a length of the text.

10. The system of claim 8, wherein at least one of the minimum time and the maximum time is defined by a user.

11. The system of claim 8, wherein the action program comprises a computer program executed by a processor from a computer-readable medium.

12. The system of claim 8, wherein the action direction program comprises a computer program executed by a processor from a computer-readable medium.

13. The system of claim 8, wherein the action comprises one of scheduling, forwarding, paging, routing and moving.

14. A computerized system comprising:
    a program in which a user is able to perform an action; and,
    an action direction program to determine an automated service to be performed in conjunction with the program after waiting a predetermined time between a minimum time and a maximum time, the predetermined time determined by performing a statistical regression as to the predetermined time based on a length of a received text.

15. The system of claim 14, wherein the action program comprises a computer program executed by a processor from a computer-readable medium.

16. The system of claim 14, wherein the action direction program comprises a computer program executed by a processor from a computer-readable medium.

17. The system of claim 14, wherein the action comprises one of scheduling, forwarding, paging, routing and moving.

* * * * *